(12) United States Patent
Jones, IV et al.

(10) Patent No.: US 7,095,791 B2
(45) Date of Patent: Aug. 22, 2006

(54) OFDM INTERFERENCE CANCELLATION BASED ON TRAINING SYMBOL INTERFERENCE

(75) Inventors: Vincent K. Jones, IV, Redwood Shores, CA (US); Derek Gerlach, Mountain View, CA (US); Gregory Raleigh, Woodside, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 11/198,381

(22) Filed: Aug. 5, 2005

(65) Prior Publication Data
US 2005/0271155 A1    Dec. 8, 2005

Related U.S. Application Data

(63) Continuation of application No. 09/565,669, filed on May 4, 2000, now Pat. No. 6,973,134.

(51) Int. Cl.
*H04K 1/00*     (2006.01)
*H04B 7/10*     (2006.01)

(52) U.S. Cl. ........................... 375/260; 375/347
(58) Field of Classification Search ............... 375/260, 375/347
See application file for complete search history.

(56) References Cited

U.S. PATENT DOCUMENTS

| | | | |
|---|---|---|---|
| 5,949,793 A | 9/1999 | Bossard et al. | 370/487 |
| 5,982,327 A | 11/1999 | Vook et al. | 342/380 |
| 6,369,758 B1 * | 4/2002 | Zhang | 342/383 |
| 6,441,786 B1 * | 8/2002 | Jasper et al. | 342/383 |
| 6,442,130 B1 | 8/2002 | Jones et al. | 370/208 |
| 6,487,253 B1 | 11/2002 | Jones et al. | 375/260 |
| 6,654,429 B1 * | 11/2003 | Li | 375/316 |
| 6,657,949 B1 | 12/2003 | Jones et al. | 370/205 |
| 6,661,835 B1 | 12/2003 | Sugimoto et al. | 375/148 |
| 6,707,856 B1 * | 3/2004 | Gardner et al. | 375/260 |
| 2002/0009096 A1 | 1/2002 | Odenwalder | 370/441 |

FOREIGN PATENT DOCUMENTS

| | | |
|---|---|---|
| WO | WO 98/09385 | 3/1998 |
| WO | WO 98/18271 | 4/1998 |

OTHER PUBLICATIONS

Horn et al., "Matrix analysis", 1986, Cambridge University Press, pp. 18-19.
Jones et al., "Improved OFDM channel indentification", 1999, U.S. Appl. No. 09/234,929.
Jones et al., "Improved system for interference cancellation", 199, U.S. Appl. No. 09/234,629.
Gardner et al., "OFDM channel estimation in the presence of interface", 1999, U.S. Appl. No. 09/410,945.

* cited by examiner

*Primary Examiner*—Kevin Kim
(74) *Attorney, Agent, or Firm*—Dov Rosenfeld; Inventek

(57) ABSTRACT

Systems and methods for optimally combining signals from multiple antennas to ameliorate the effects of noise and/or interference on OFDM communications are provided. In one embodiment, an initial spatial statistical characterization of interference and/or noise is based on training symbols received via each antenna. Because the transmitted values of the training symbols are already known, there is no need to estimate their transmitted value to form this initial statistical characterization. The data symbol values received via the multiple antennas are combined based on the initial spatial statistical characterization. The result of this combination step is then used to form a refined spatial statistical characterization of noise and/or interference. The received data symbol values are then recombined based on the refined spatial statistical characterization.

24 Claims, 3 Drawing Sheets

OFDM INTERFERENCE CANCELLATION BASED ON TRAINING SYMBOL INTERFERENCE

STATEMENT OF RELATED APPLICATIONS

The present application is a continuation of co-assigned U.S. application Ser. No. 09/565,669 filed May 4, 2000 now U.S. Pat. No. 6,973,134 to inventors JONES, et al., titled OFDM INTERFERENCE CANCELLATION BASED ON TRAINING SYMBOL INTERFERENCE, the contents of which are herein incorporated by reference in their entirety.

The present application is related to the subject matter of co-assigned U.S. application Ser. No. 09/234,629, filed on Jan. 21, 1999, the contents of which are herein incorporated by reference in their entirety.

BACKGROUND OF THE INVENTION

The present invention is related to digital communication systems and more particularly to systems and methods for ameliorating the effects of interference.

It is known to use adaptive spatial processing to exploit multiple antenna arrays to increase the communication quality of wireless systems. A weighting among antennas is chosen based on content of the signals received via multiple antenna elements. The spatial processor selects a weighting that optimizes reception of a desired signal while minimizing the deleterious effects of undesired signals.

OFDM (Orthogonal Frequency Division Multiplexing) is another highly useful communication technique. In OFDM, the available bandwidth is divided into subchannels that are orthogonal to one another in the frequency domain. A high data rate signal is effectively transmitted as a set of parallel low data rate signals, each one being carried over a separate subchannel. OFDM addresses a problem known as multipath caused by differences in delay time among different paths taken from a transmitter to a receiver. The effect of multipath is intersymbol interference created by energy associated with different symbols sharing a common arrival time. By creating multiple low data rate subchannels, OFDM lengthens the period occupied by a single symbol so that dispersive effects tend to be confined within a single symbol period, thereby reducing intersymbol interference.

Co-assigned U.S. patent application Ser. No. 09/234,629 discloses techniques for applying multiple antenna adaptive spatial processing to ameliorating interference in OFDM systems. In one of the techniques described there, an initial estimate is formed for the received data symbols independently for each antenna. This initial estimate is a so-called "hard decision" as to which data symbols was most likely transmitted. Based on this initial estimate, the noise and/or interference is also determined independently for each antenna. The noise and/or interference and its spatial profile is then statistically characterized over time and/or frequency based on the information received from all the antennas. The system then determines cost metric values suitable for input to a trellis decoding process based on the spatial statistical characterization and the raw frequency domain data symbol values as received via each antenna. The data symbol values from the different antennas are effectively combined so as to minimize the impact of interferers.

A problem arises in implementing this technique when there is heavy noise and interference. When a data symbol value becomes corrupted by noise and/or interference, a wrong hard decision results. Under strong noise and/or interference conditions, large numbers of wrong hard decisions degrade the spatial statistical characterization of noise and/or interference to the point that the system no longer optimally combines data symbol values from the antennas. Optimal interference cancellation no longer occurs and in effect, the system loses track of the spatial characteristics of the noise and/or interference and can no longer properly take them into account.

What is needed are systems and methods applicable to OFDM for effectively combining signals from multiple antennas to ameliorate the effects of even strong noise and/or interference.

SUMMARY OF THE INVENTION

Systems and methods for optimally combining signals from multiple antennas to ameliorate the effects of noise and/or interference on OFDM communications are provided by virtue of one embodiment of the present invention. In one embodiment, an initial spatial statistical characterization of interference and/or noise is based on training symbols received via each antenna. Because the transmitted values of the training symbols are already known, there is no need to estimate their transmitted value to form this initial statistical characterization. The data symbol values received via the multiple antennas are combined based on the initial spatial statistical characterization. The result of this combination step is then used to form a refined spatial statistical characterization of noise and/or interference. The received data symbol values are then recombined based on the refined spatial statistical characterization.

One aspect of the present invention provides a method for receiving an OFDM signal via a plurality of outputs of a channel in the presence of noise and/or interference. The method includes: receiving an OFDM burst via the plurality of channel outputs, separating training symbols of the OFDM burst, forming a first statistical characterization of noise and/or interference based on the training symbols received via the plurality of outputs and not on other symbols of the OFDM burst. The method further includes combining data symbols of the OFDM burst as received via the plurality of channel outputs based on the first statistical characterization to form combined data symbol estimates, forming a second statistical characterization of noise and/or interference based on the combined data symbol estimates, and recombining the data symbols of the OFDM burst received via the plurality of channel outputs based on the second statistical characterization.

A further understanding of the nature and advantages of the inventions herein may be realized by reference to the remaining portions of the specification and the attached drawings.

DESCRIPTION OF SPECIFIC EMBODIMENTS

Figure 1:
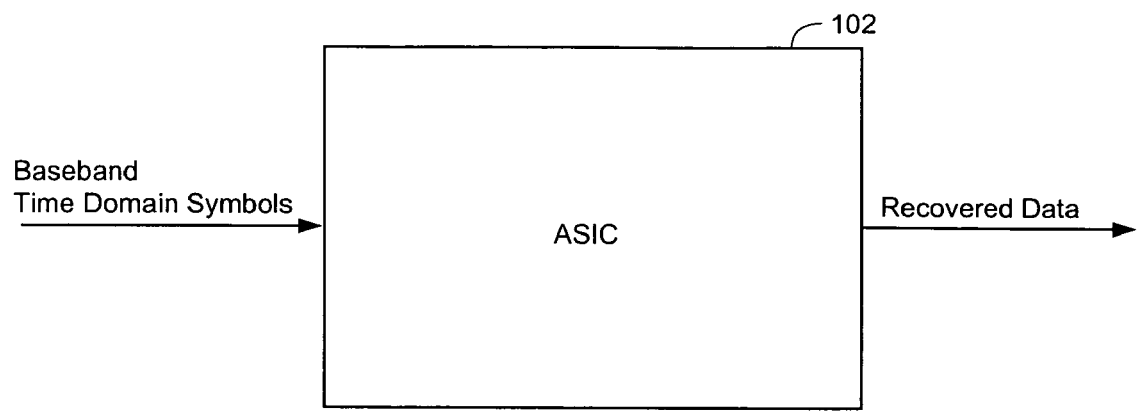
FIG. 1 depicts an ASIC system suitable for implementing one embodiment of the present invention.

The present invention is described in the context of the use of OFDM (Orthogonal Frequency Division Multiplexing) for communication, although the present invention is not limited to OFDM. In OFDM, the available bandwidth is effectively divided into a plurality of subchannels that are orthogonal in the frequency domain. During a given symbol period, the transmitter transmits a symbol in each subchannel. To create the transmitted time domain signal corresponding to all of the subchannels, an IFFT is applied to a series of frequency domain symbols to be simultaneously transmitted, a "burst." The resulting series of time domain symbols is augmented with a cyclic prefix prior to transmission. The cyclic prefix addition process can be characterized by the expression:

$$[z(1) \ldots z(N)]^T \mapsto [z(N-v+1) \ldots z(N)\ z(1) \ldots z(N)]^T$$

On the receive end, the cyclic prefix is removed from the received time domain symbols. An FFT is then applied to recover the simultaneously transmitted frequency domain symbols. The cyclic prefix has length v where v is greater than or equal to a duration of the impulse response of the overall channel and assures orthogonality of the frequency domain subchannels.

There are other ways of simultaneously transmitting a burst of symbols in orthogonal channels or substantially orthogonal channels including, e.g., use of the Hilbert transform, use of the wavelet transform, using a batch of frequency upconverters in combination with a filter bank, etc. Wherever the term OFDM is used, it will be understood that this term includes all alternative methods of simultaneously communicating a burst of symbols in orthogonal or substantially orthogonal subchannels. The term frequency domain should be understood to refer to any domain that is divided into such orthogonal or substantially orthogonal subchannels.

A part of such an OFDM communication system will be one or more OFDM receivers. An OFDM receiver receives an OFDM signal in the form of a carrier wave at a carrier frequency. The carrier wave is converted to a baseband signal and converted from analog to digital to form a series of time domain symbols. The time domain symbols are grouped into bursts. Each burst includes the cyclic prefix that was added at the transmitter end. The cyclic prefix is removed from each burst and the burst is converted into the frequency domain. The receiver uses the frequency domain symbols to recover the transmitted data.

A refinement to the OFDM receiver is to take advantage of multiple antennas. For each antenna, the steps leading to development of the frequency domain symbols are performed independently. The receiver then combines the results of processing via each antenna to ameliorate the effects of interference and noise. This combination processing takes advantage of the fact that the desired transmitter and undesired interferers will often tend to distribute their signals among the multiple antennas differently because they radiate from different locations. By statistically characterizing the distribution of desired signals and interferers, the receiver can derive an optimal weighting among antennas to reduce the effects of noise and interference. In OFDM, this weighting is preferably varied for each frequency domain subchannel. In one embodiment, the present invention is directed towards OFDM receivers using improved spatial processing to combine OFDM signals from multiple antennas.

FIG. 1 depicts an application specific integrated circuit (ASIC) 102 suitable for implementing one embodiment of the present invention. ASIC 102 removes the cyclic prefix from time domain bursts, converts the time domain symbols to the frequency domain, and combines the frequency domain symbols from multiple antennas. ASIC 102 may also include other signal processing functions such as error correction coding, deinterleaving, etc. A field programmable gate array (FPGA) or other hardware may substitute for all or part of ASIC 102.

Figure 2:
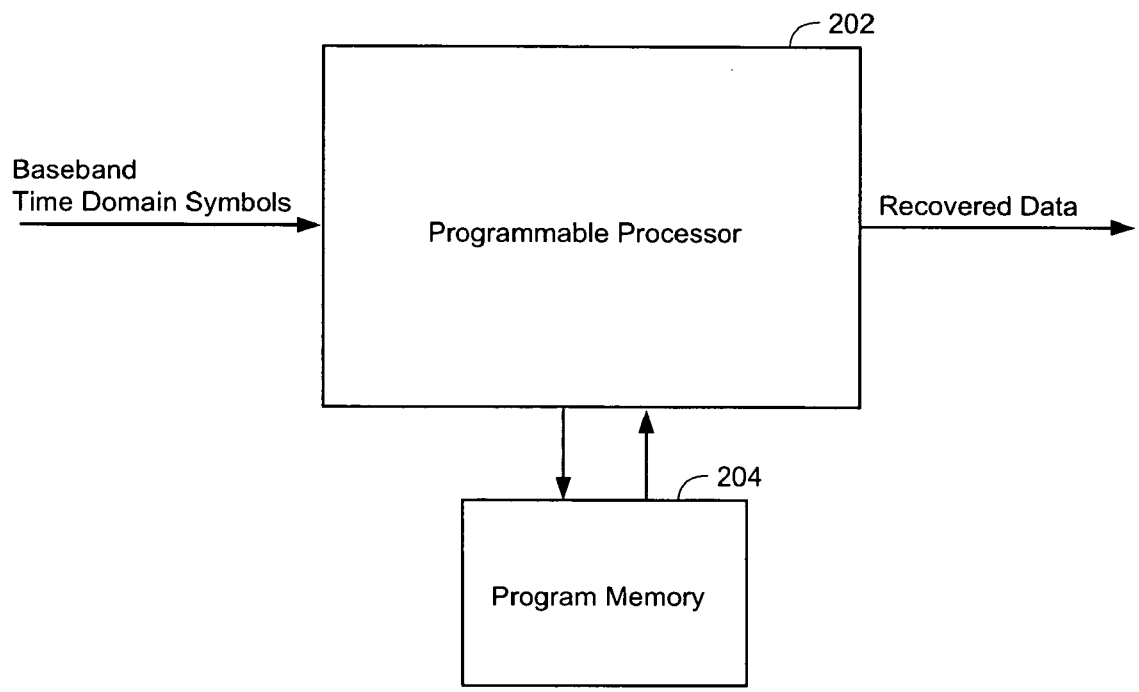
FIG. 2 depicts a programmable processor arrangement suitable for implementing one embodiment of the present invention.

FIG. 2 depicts an alternative scheme for implementing one embodiment of the present invention. A programmable processor 202 runs software stored in a program memory 204 to perform functions essential similar to the functions performed by ASIC 102. Alternatively, these functions may be performed by some combination of an ASIC and a programmable processor. Program memory 204 is typically a short term memory. Long term storage of the software for programmable processor 202 may be in a ROM, a hard drive, a floppy disk, etc. Software may also be obtained via a network such as the Internet.

Figure 3:
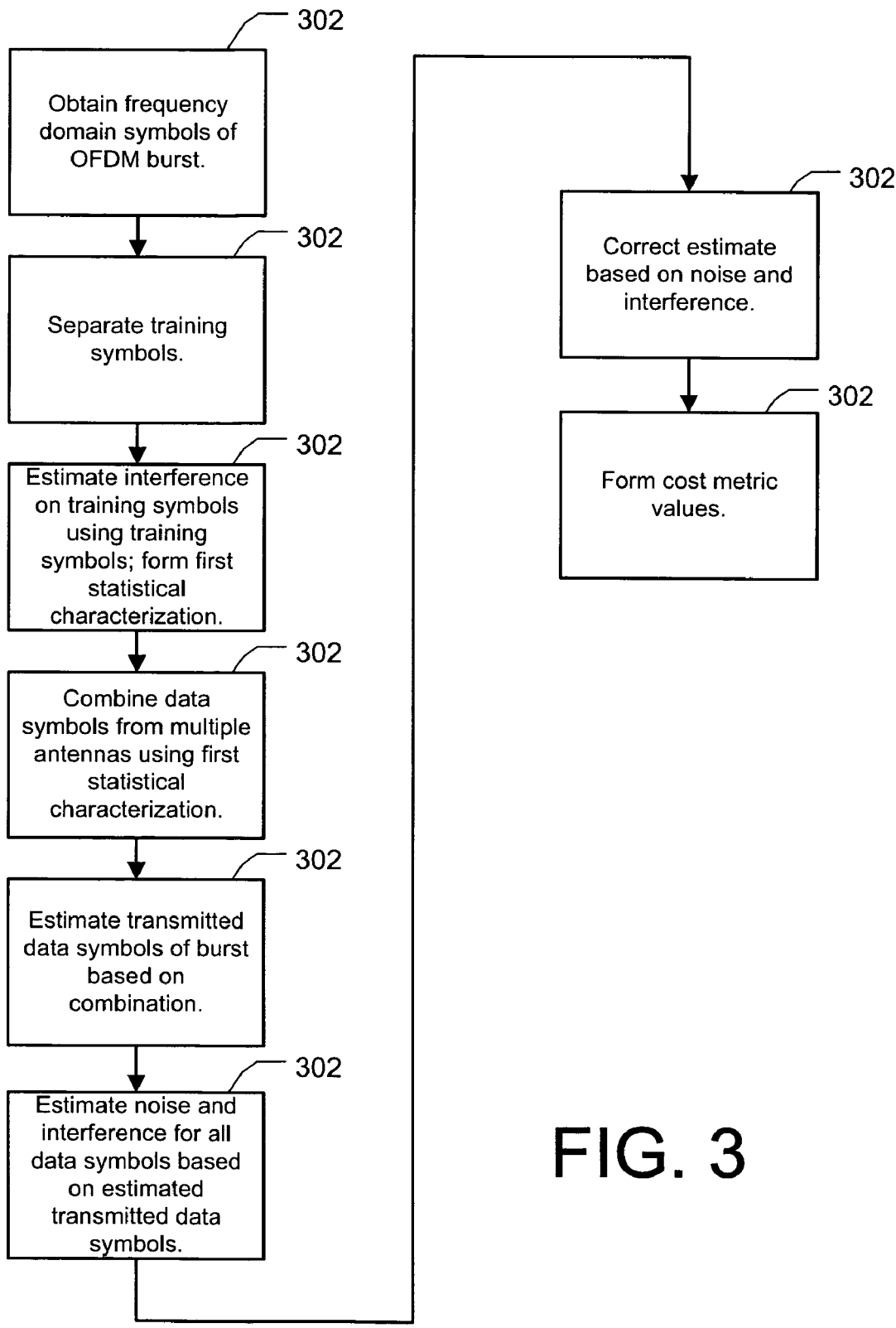
FIG. 3 is a flowchart describing steps of processing received OFDM signals according to one embodiment of the present invention.
Figure 4:
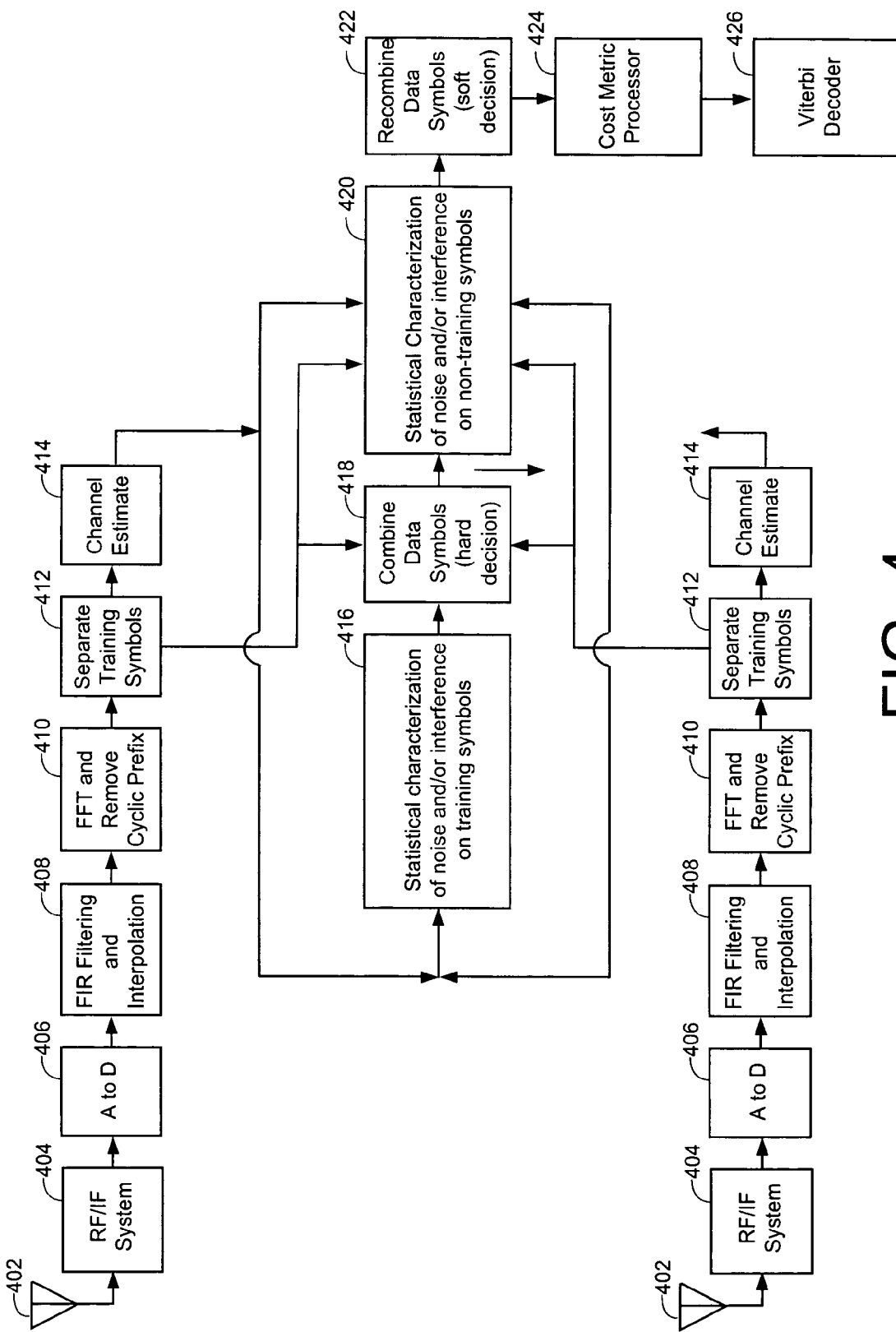
FIG. 4 depicts a diagram of an OFDM receiver according to one embodiment of the present invention.

FIG. 3 is a flowchart describing steps of processing received OFDM signals according to one embodiment of the present invention. FIG. 4 depicts a diagram of an OFDM receiver 400 according to one embodiment of the present invention.

Receiver system 400 collects signals from a plurality of antennas 402. In FIG. 4, two antennas are shown, although any number of antennas may be used. Many components depicted in FIG. 4 are duplicated for each antenna.

Each antenna 402 is coupled to an RF/IF system 404 which performs initial analog filtering and amplification prior to downconversion to an intermediate frequency (IF) where further filtering and signal conditioning may be performed. The signal is then converted to baseband for input to an analog to digital converter 406. Alternatively, analog to digital conversion may occur at the IF. Further filtering and interpolation occurs in an FIR filter block 408. The next stage is an FIT processor 410 that, at step 302, removes the cyclic prefix from N+v long time domain symbol bursts and then applies the FFT to recover N frequency domain symbols for each successive OFDM burst.

In one embodiment, at least v of the N frequency domain symbols are training symbols having known transmitted values. At step 304, a training symbol separation block 412 extracts the training symbols from each burst. Spatial processing according to one embodiment of the present invention depends in part on estimating the response of the channel for every frequency domain subchannel n among N frequency domain symbols. This is the function of a channel estimation processor 414. The received values of the training symbols are used to determine the channel response over the entire available frequency domain channel. Details of channel estimation techniques are described in WO98/09385 and in co-filed U.S. patent application Ser. No. 09/234,929. The entire contents of both documents are herein incorporated by reference. To facilitate spatial processing, channel estimation processor 414 generates an intermediate channel response estimate for each training symbol position within the burst:

$$B(n) = Y_T(n)/(Z_T(n)/|Z_T(n)|) = Y_T(n)Z_T^*(n)/|Z_T(n)|\ n = 0,1,\ldots,v-1.$$

where $Y_T(n)$ is the received training symbol value and $Z_T(n)$ is the transmitted training symbol at frequency domain subchannel n.

At step 306, the interference and/or noise present on the training symbols as received is estimated and statistically characterized for each antenna by a first statistical characterization block 416. Because the transmitted values of the training symbols are known, it is not necessary to base this estimate of interference and/or noise on an estimate of the transmitted symbol that may itself be corrupted. The interference and/or noise for each training symbol is estimated by:

$$W_{Ti}(n, b) = \frac{1}{2}(B_i(n, b) - B_i(n, b-1)), \quad i \in \{0, 1, \ldots, v-1\}.$$

where i identifies the antenna and b identifies the burst in sequence.

The $W_{Ti}$ values are used to construct a rank-one covariance matrix:

$$R_T(n) = \begin{bmatrix} W_{T1}(n) \\ W_{T2}(n) \end{bmatrix} [W_{T1}^*(n) W_{T2}^*(n)]$$

$$= \begin{bmatrix} |W_{T1}(n)|^2 & W_{T1}(n)W_{T2}^*(n) \\ W_{T2}(n)W_{T1}^*(n) & |W_{T2}(n)|^2 \end{bmatrix}, n \in \{0, 1, \ldots, v-1\}$$

The matrix includes both autocorrelation and cross-correlation elements. Because of the symmetry in this matrix, only four real quantities need to be computed: the (real) diagonal elements, and the real and imaginary parts of either off-diagonal element.

Each matrix is averaged over bursts using a single-pole filter:

$$R_{T,avg}(n,b) = (1-\beta)R_{T,avg}(n,b-1) + \beta R_T(n,b) n \in \{0,1,\ldots,v-1\}$$

$\beta$ is a programmable real constant in the range [0,1]; to simplify implementation, it is preferably equivalent to $1-2^{-p}$, where $p \in \{1,2,3,4,5,6\}$.

At step 308, the data symbols received from each antenna are combined by a combining block 418 using the statistical characterization formed at step 306. For each data symbol, the following quantity is computed:

$$\hat{Z}_{hard}(n) = \left([H_1^*(n)H_2^*(n)][\text{adj} R_{T,avg}(t_{near}(n))]\begin{bmatrix} H_1(n) \\ H_2(n) \end{bmatrix}\right)^{-1}$$

$$\left([H_1^*(n)H_2^*(n)][\text{adj} R_{T,avg}(t_{near}(n))]\begin{bmatrix} Y_1(n) \\ Y_2(n) \end{bmatrix}\right)$$

$n \in \{\text{all data symbols}\}$ $t_{near}(n) = \lfloor vn/N + 1/2 \rfloor$

The above expression represents a weighting of the Y[n] values received via each antenna i as specified by the $R_T$ matrix and the estimated channel response. At step 310, this complex value is then rounded to the nearest constellation point used by the transmitted symbols. The function $t_{near}(n)$ is used to select the R matrix from the closest training tone to perform the combining. The result is a hard decision estimate for each data symbol.

Then at step 312, a second statistical characterization block 420 determines the noise and/or interference on the data symbols based on the data symbol hard decisions determined at step 310. This is done by finding, for each antenna, the difference between the data symbols as received and the hard decision values determined at step 310:

$$W_i(n) = \begin{cases} Y_1(n) - H_I(n)Z_{hard}(n) & k \in \{\text{data symbols}\} \\ Y_i(n) & k \in \{\text{zero symbols}\} \end{cases} \quad i \in \{1, 2\}$$

Where $H_i(n)$ is a channel estimate provided by channel estimation processor 414.

Note that the above assumes that some of the frequency domain symbols are set to zero at the transmit side which is typically done to control out-of-band emissions. Then, for each symbol position, including data symbols, training symbols, and zero symbols, an intermediate covariance matrix, R, is constructed:

$$R(n) = \begin{cases} \begin{bmatrix} |W_1|^2 & W_1 W_2^* \\ W_2 W_1^* & |W_2|^2 \end{bmatrix} & n \in \{\text{data symbols or zero symbols}\} \\ R_{T,avg}(nv/N) & n \in \{\text{training symbols}\} \end{cases}$$

Note that the covariance matrices $R_T$ for the training symbols are taken from the calculation of step 306. Second statistical characterization block 420 then smoothes the R matrix values over frequency:

$$R_{avg}(n) = \frac{1}{N_{term}} \sum_{m=n-\lfloor N_{term}/2 \rfloor}^{n-\lfloor N_{term}/2 \rfloor + N_{term}} R(m)$$

where $N_{term}$ is equal to 9 in one embodiment.

At step 314, a soft decision value system 422 develops estimates of the transmitted data symbol values that take into account the second statistical characterization of noise and/or interference developed by block 420. This is a reweighting among antennas. For each data symbol, the soft decision value is:

$$\hat{Z}(n) = \left([H_1^*(n)H_2^*(n)][\text{adj} R_{avg}(n)]\begin{bmatrix} H_1(n) \\ H_2(n) \end{bmatrix}\right)^{-1} \left([H_1^*(n)H_2^*(n)][\text{adj} R_{avg}(n)]\begin{bmatrix} Y_1(n) \\ Y_2(n) \end{bmatrix}\right)$$

where $H_i(n)$ is the channel response at symbol position n as developed by channel estimation processor 414 for antenna i. Soft decision value system 422 also determines a confidence value for each data symbol that indicates the reliability of the soft decision value estimate. This confidence value allows the decoding system to assign greater weight to symbols received via frequency domain subchannels having relatively high signal to noise plus interference ratios. The confidence value is determined by:

$$\bar{q}(n) = (\det R_{avg}(n))^{-1}\left([H_1^*(n)H_2^*(n)][\text{adj} R_{avg}(n)]\begin{bmatrix} H_1(n) \\ H_2(n) \end{bmatrix}\right) n \in \{\text{all data symbols}\}$$

The output of soft decision system 422 consists of the soft decision and confidence values for individual symbols. It is preferable, however, to develop cost metric values for individual bits. These cost metric values can then be the input to a Viterbi decoder. The process of developing cost metric values for individual bits is referred to as constellation bit mapping.

At step 316, a constellation bit mapping block 424 determines cost metric values for individual bits. Each symbol soft decision value is a complex value including an I (in-phase) and Q (quadrature) component. Each symbol represents m bits. The m bits are divided into two groups of m/2 bits, one group representing the I axis and the other group representing the Q axis. The constellation bit mapping process is performed separately for each group.

If 256-QAM is the constellation scheme used to transform bits to be transmitted to frequency domain symbols, m=8. The soft decision value for each group of m/2 bits is initially determined by calculations:

$$s_0 = \hat{Z}s_1 = 2^{m/2-2} - |s_0|s_2 = 2^{m/2-3} - |s_1|s_3 = 2^{m/2-4} - |s_2|$$

For smaller constellations, only the first m/2 of the above equations are used (1 for QPSK, 2 for 16QAM, 3 for 64QAM.) These bit by bit soft decision values should then be scaled to form:

$$w = s/(\alpha \bar{q})$$

where $\alpha$ is a programmable scaling factor.

These scaled soft decision values are then the input to a Viterbi decoder 426. Viterbi decoder 426 decodes according to the convolutional coding scheme applied at the transmit side.

It is understood that the examples and embodiments described herein are for illustrative purposes only and that various modifications or changes in light thereof will be suggested to persons skilled in the art and are to be included within the spirit and purview of this application and scope of the appended claims and their full scope of equivalents. For example, all formulas given above are merely representative of procedures that may be used. The present invention may be applied to either wired or wireless systems. Instead of multiple antennas, a receiver according to the invention may take advantage of any multiple outputs from a communication channel. All publications, patents, and patent applications cited herein are hereby incorporated by reference.

We claim:

1. In a receiver of a digital communication system, a method for receiving an OFDM signal via a channel in the presence of noise and/or interference, the receiver including a plurality of antennas, the method comprising:
    (a) receiving via the plurality of antennas a time domain OFDM burst that includes training symbols of known transmitted values in at least some of frequency subchannels of the channel;
    (b) converting the time-domain OFDM burst received at each antenna to form sets of frequency domain subchannel values, each set corresponding to one of the antennas;
    (c) separating training symbols of said received OFDM burst and determining estimates of the channel response of the at least some of the frequency subchannels using the known transmitted values of the training symbols;
    (d) forming a first statistical characterization of noise and/or interference of the at least some of the frequency subchannels using the determined estimates;
    (e) combining the sets of frequency domain subchannel values corresponding to the antennas, including the data symbols of the received OFDM burst based on said first statistical characterization to form combined data symbol estimates;
    (f) forming from the combined data symbol estimates hard decision estimates of the received symbols in each frequency subchannel;
    (g) forming a second characterization of noise and/or interference based on the hard decision estimates; and
    (h) forming estimates of the transmitted data symbols in the subchannels taking into account the formed second statistical characterization.

2. In a receiver of a digital communication system, a method for receiving an OFDM signal in the presence of noise and/or interference, the receiver including a plurality of antennas, the method comprising:
    (a) receiving via the plurality of antennas a time domain OFDM burst that includes training symbols of known transmitted values in at least some of frequency subchannels of an available frequency channel;
    (b) converting the time-domain OFDM burst received at each antenna to form sets of frequency domain subchannel values, each set corresponding to one of the antennas;
    (c) separating training symbols of said received OFDM burst and determining estimates of the channel response of the at least some of the frequency subchannels using the known transmitted values of the training symbols;
    (d) forming a first statistical characterization of noise and/or interference of the at least some of the frequency subchannels using the determined estimates;
    (e) combining the sets of frequency domain subchannel values corresponding to the antennas, including the data symbols of the received OFDM burst, the combining including weighting using a first set of weights determined using first statistical characterization to form combined data symbol estimates as hard decision estimates of the received symbols in each frequency subchannel based on the results of the weighting;
    (f) forming a second statistical characterization of noise and/or interference using the hard decision estimates; and
    (g) forming estimates of the transmitted data symbols in the subchannels taking into account the formed second statistical characterization, including weighting the sets of frequency domain subchannel values using a second set of weights determined using the formed second statistical characterization and forming soft decision values.

3. A method as recited in claim 2, wherein (d) includes averaging over a plurality of bursts.

4. A method as recited in claim 2, wherein (f) uses a measure of the difference for each antenna between data symbol values as received and the hard decision estimates formed in (e).

5. A method as recited in claim 4, wherein (f) further includes smoothing over frequency.

6. A method as recited in claim 2, wherein in (e) forming the hard decision estimates forms the closest possible transmitted data symbols to the results of the weighting using the first set of weights.

7. A method as recited in claim 2, further comprising:
    (h) determining a confidence level for each formed soft decision value of (g), such that a decoding system can assign greater weight to symbols received via subchannels that have relatively high signal-to-noise and/or interference ratio, as indicated by the confidence value.

8. A method as recited in claim 2, further comprising forming a cost metric usable by a Viterbi decoder.

9. A method as recited in claim 2, wherein (d) includes smoothing a statistical characterization over time.

10. A method of receiving data symbols in a receiver comprising a plurality of antennas, the data symbols transmitted as OFDM bursts in subchannels of a channel, the OFDM bursts including known training symbols, the method comprising:
   converting received time-domain data received at each antenna into sets of subchannel values corresponding to each antenna;
   determining channel estimates corresponding to subchannels via each antenna using received training symbols separated from the sets of subchannel values;
   forming a first set of estimates of data symbol received in the subchannels from the sets of subchannel values, including weighting the sets of subchannel values using a first set of weights determined from a first statistical characterization of the noise and/or interference on the received training symbols, and including making symbol decisions; and
   forming a second set of estimates of data symbols received in the subchannels from the sets of subchannel values, including weighting using a second set of weights determined from a second statistical characterization, the second statistical characterization being of the noise and/or interference on received data other than the training symbols, the second statistical characterization determined using the data symbol estimates.

11. A method as recited in claim 10, wherein the first statistical characterization is determined from the determined channel estimates, and includes averaging over a plurality of bursts.

12. A method as recited in claim 10, wherein the second statistical characterization is determined using a measure of the difference for each antenna between data symbol values as received and the first set of symbol estimates.

13. A method as recited in claim 12, wherein determining the second statistical characterization further includes smoothing over frequency.

14. A method as recited in claim 10, further comprising:
   determining a confidence level for each formed data symbol estimate of the second set such that a decoding system can assign greater weight to symbols received via subchannels that have relatively high signal-to-noise and/or interference ratio, as indicated by the confidence value.

15. A method as recited in claim 10, further comprising forming a cost metric usable by a Viterbi decoder with the second set of estimates of data symbols.

16. A method as recited in claim 10, wherein determining the first statistical characterization includes smoothing a statistical characterization over time.

17. Means for receiving data symbols in a receiver comprising a plurality of antennas, the data symbols transmitted as OFDM bursts in subchannels of a channel, the OFDM bursts including known training symbols, the means for receiving comprising:
   means for converting received time-domain data received at each antenna into sets of subchannel values corresponding to each antenna;
   means for determining channel estimates corresponding to subchannels via each antenna using received training symbols separated from the sets of subchannel values; and
   means for forming a first set of estimates of data symbol received in the subchannels from the sets of subchannel values, the means for forming the first set including:
      means for weighting the sets of subchannel values using a first set of weights determined from a first statistical characterization of the noise and/or interference on the received training symbols;
   means for making symbol decisions; and
   means for forming a second set of estimates of data symbols received in the subchannels from the sets of subchannel values, the means for forming a second set including:
      means for weighting using a second set of weights determined from a second statistical characterization, the second statistical characterization being of the noise and/or interference on received data other than the training symbols, the second statistical characterization determined using the data symbol estimates.

18. Means for receiving as recited in claim 17, wherein the first statistical characterization is determined from the determined channel estimates, and includes averaging over a plurality of bursts.

19. Means for receiving as recited in claim 17, wherein determining the second statistical characterization further includes smoothing over frequency.

20. Means for receiving as recited in claim 17, further comprising:
   means for determining a confidence level for each formed data symbol estimate of the second set such that a means for decoding can assign greater weight to symbols received via subchannels that have relatively high signal-to-noise and/or interference ratio, as indicated by the confidence value.

21. An apparatus for receiving data symbols in a receiver comprising a plurality of antennas and a signal path for each antenna, the data symbols transmitted as OFDM bursts in subchannels of a channel, the OFDM bursts including known training symbols, the apparatus comprising:
   for each antenna signal path, a time-to-frequency converter configured to accept time-domain samples determined from signals received at the antenna of the antenna signal path and to convert the time-domain samples into a set of subchannel values corresponding to the antenna;
   for each antenna signal path, a channel estimator coupled to the time-to-frequency converter and configured to determine channel estimates corresponding to subchannels via the antenna of the antenna signal path using received training symbols separated from the set of subchannel values corresponding to the antenna;
   a first processing circuit configured to form a first set of estimates of data symbols received in the subchannels from the sets of subchannel values, forming the first set of estimates including weighting the sets of subchannel values corresponding to the antennas using a first set of weights determined from a first statistical characterization of the noise and/or interference on the received training symbols, and including making symbol decisions; and
   a second processing circuit configured to form a second set of estimates of data symbols received in the subchannels from the sets of subchannel values corresponding to the antennas, forming the second set of estimates including weighting using a second set of weights determined from a second statistical characterization, the second statistical characterization being of the noise and/or interference on received data other than the training symbols, the second statistical characterization determined using the data symbol estimates.

22. An apparatus as recited in claim 21, wherein the second processing circuit is further configured to determine a confidence level for each formed data symbol estimate of the second set such that a decoding system can assign greater weight to symbols received via subchannels that have relatively high signal-to-noise and/or interference ratio, as indicated by the confidence value.

23. apparatus as recited in claim 22, further comprising:
a Viterbi decoder configured to accept the confidence levels and the second set of estimates.

24. A method of receiving data symbols in a receiver, the data symbols transmitted as OFDM bursts in subchannels of a channel, the OFDM bursts including known training symbols, the method comprising:

converting received time-domain data received into a set of subchannel values corresponding to each antenna;

determining channel estimates corresponding to subchannels using received training symbols separated from the set of subchannel values;

forming a first set of estimates of data symbols received in the subchannels from the sets of subchannel values using a first statistical characterization of the noise and/or interference on the received training symbols; and forming a second set of estimates of data symbols received in the subchannels from the set of subchannel values using a second statistical characterization, the second statistical characterization determined using the data symbol estimates and being of the noise and/or interference on received data other than the training symbols.

* * * * *